May 1, 1928.
P. RING
HEADLIGHT ATTACHMENT
Filed Feb. 6, 1926
1,667,949
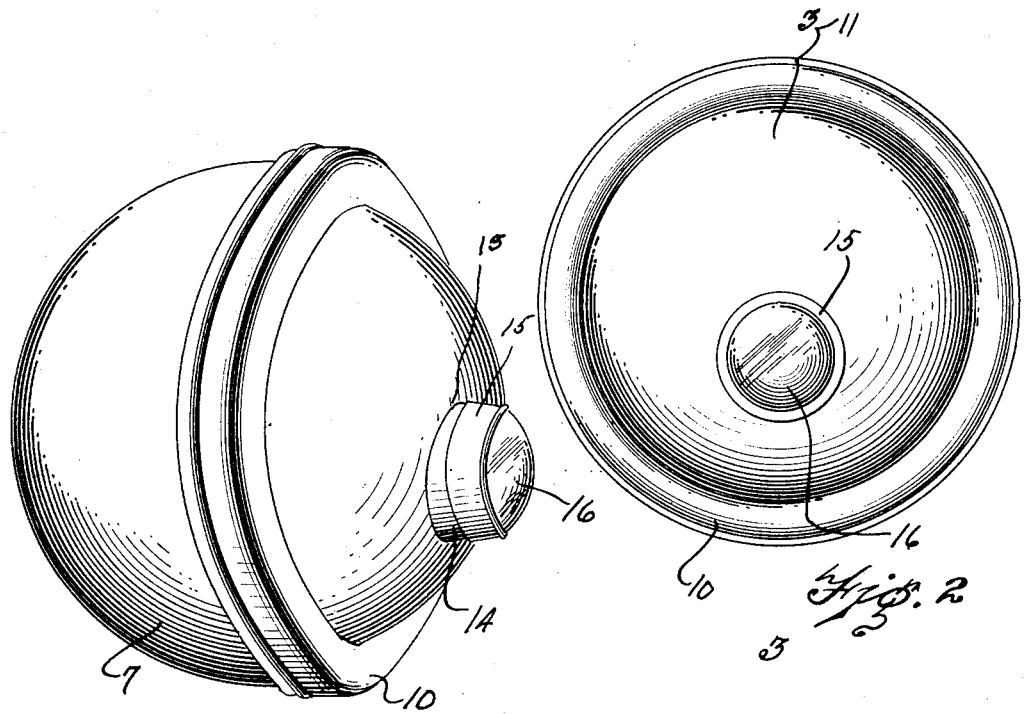
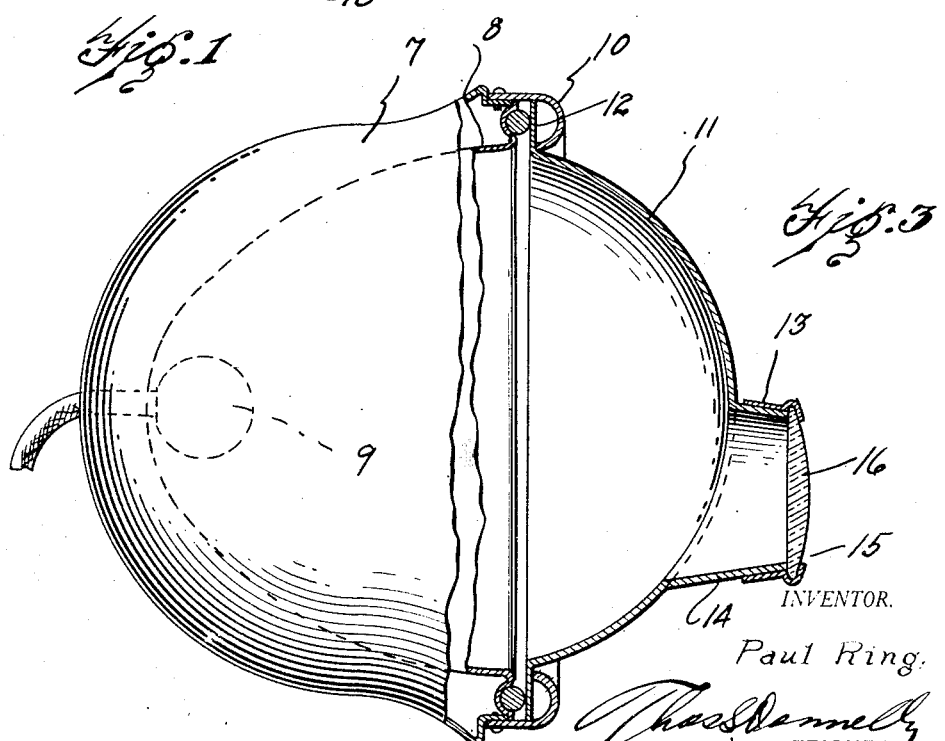
INVENTOR.
Paul Ring.
ATTORNEY.

Patented May 1, 1928.

1,667,949

UNITED STATES PATENT OFFICE.

PAUL RING, OF DETROIT, MICHIGAN.

HEADLIGHT ATTACHMENT.

Application filed February 6, 1926. Serial No. 86,431.

My invention relates to a new and useful improvement in a headlight attachment and has for its object the provision of an attachment mountable upon a vehicle headlight so as to eliminate the glare which is quite common on vehicle headlights, without diminishing to any great extent in the lighting effectiveness of the rays emanating from the headlight.

Another object of the invention is the provision of an attachment of this class which may be mounted on a conventional type of headlight so arranged and constructed as to deflect the rays of light emanating from the headlight to any desired angle or inclination.

Another object of the invention is the provision of an attachment of this class which will be simple in structure, economical of manufacture and highly efficient in use and easily mounted and demounted upon and from the headlight with which used.

Other objects will appear hereinafter.

The invention consists in the combination and arrangement of parts hereinafter described and claimed.

The invention will be best understood by a reference to the accompanying drawings which form a part of this specification and in which Fig. 1 is a perspective view of a headlight embodying the invention.

Fig. 2 is a front elevational view of a headlight showing the invention attached.

Fig. 3 is a sectional view taken on substantially line 3—3 of Fig. 2, showing parts in section and parts in elevation.

As shown in the drawings the invention is adapted for use with a headlight 7 having a reflector 8 mounted therein and provided with a light bulb 9 in the conventional manner. A rim 10 which is also of conventional type is used for securing the invention in position on the headlight. The invention comprises a semi-spherical body 11 which is formed from opaque material and preferably metal having its inner surface unburnished.

In the construction of the device it has been found that by forming the semi-spherical body from brass leaving the inner surface unburnished very efficient results are obtained.

Projecting diametrically outwardly from the body 11 are edge flanges 12 which are engaged by the rim 10 so as to mount the body on the headlight.

The body 11 is provided with the outwardly drawn neck, one side 13 being shorter in length than the other side 14 in order to have the mouth of the neck extending parallel to the vertical diametric plane of the body 11. Mounted on the neck is a sleeve 15 in which is secured lens 16, the end of the sleeve being curled around the edges of the lens 16.

It will be noted that the neck 15 is located eccentrically of the spherical body 11 so that the spherical body 11 may be rotated relatively to the headlight 7 to direct the rays of light which emanate from the neck in different directions. The body 11 being opaque prevents the passage of rays of light so that the rays of light emanating from the head light are obliged to pass through the lens 16. By forming the neck eccentrically as mentioned a rotation of the body 11 relatively to the headlight will permit the rays of light to be directed toward the side of the road, upwardly from the vehicle or directed downwardly in front of the vehicle as desired. The adjustment of the device may be made by the driver of the vehicle to conform to his wishes depending upon the nature of the road over which traveling. This adjustment will be determined largely by the location of the vehicle or where the vehicle is driven—for example in the city and in the country.

The device has proven quite effective in eliminating glare and the rays of the light striking the body 11 and being in turn reflected back to the reflector are eventually directed through the lens 16 so that the effectiveness for the headlight for lighting purposes is not diminished to any great extent.

While I have illustrated and described the preferred form of structure, I do not wish to limit myself to the precise form of structure shown, but desire to avail myself of such variations and modifications as come within the scope of the appended claim.

Having thus described my invention what I claim as new and desire to secure by Letters Patent is:

A device of the class described adapted for use on a vehicle headlight, comprising: a semi-spherical, opaque body; means for mounting said body on said headlight with the convex side thereof projecting outwardly from said headlight; a frusto-conical, comparatively elongated neck projecting outwardly from said body eccentrically thereof; a transparent closure for the outer end of said neck, said closure lying parallel to the plane determined by the forward side of said headlight; and means for retaining said closure in position on said neck.

In testimony whereof, I have signed the foregoing.

PAUL RING.